US012762630B1

(12) United States Patent
Magnússon et al.

(10) Patent No.: US 12,762,630 B1
(45) Date of Patent: Oct. 13, 2026

(54) METHOD, DEVICE AND SYSTEM FOR PREDICTING A FISH-PRESENCE MATRIX FOR DETERMINING A FISHING GROUND

(71) Applicant: GreenFish hf., Reykjavík (IS)

(72) Inventors: Sigurður Bjartmar Magnússon, Copenhagen (DK); Sveinn Sigurður Jóhannesson, Garðabær (IS)

(73) Assignee: GreenFish hf., Reykjavík (IS)

( * ) Notice: Subject to any disclaimer, the term of this patent is extended or adjusted under 35 U.S.C. 154(b) by 0 days.

(21) Appl. No.: 19/385,372

(22) Filed: Nov. 11, 2025

(51) Int. Cl.
*G06Q 50/02* (2024.01)
*A01K 61/95* (2017.01)
*G06N 3/08* (2023.01)

(52) U.S. Cl.
CPC ............ *G06Q 50/02* (2013.01); *A01K 61/95* (2017.01); *G06N 3/08* (2013.01)

(58) Field of Classification Search
CPC ........... G06Q 50/02; A01K 61/95; G06N 3/08
See application file for complete search history.

(56) References Cited

U.S. PATENT DOCUMENTS

| | | | |
|---|---|---|---|
| 9,195,370 | B1 | 11/2015 | Hlatky, Jr. et al. |
| 9,298,978 | B1 | 3/2016 | Hlatky et al. |
| 2019/0230913 | A1 | 8/2019 | Chen et al. |

FOREIGN PATENT DOCUMENTS

| | | | |
|---|---|---|---|
| CN | 113836815 | A | 12/2021 |
| CN | 116128129 | A | 5/2023 |
| JP | 2022115252 | A | 8/2022 |
| WO | 2020196543 | A1 | 10/2020 |

OTHER PUBLICATIONS

Wang et al., "A novel spatial-temporal prediction method for the effects of fish movement on flow field based on hybrid deep neural network", Jul. 4, 2024, Engineering Applications of Computational Fluid Mechanics, vol. 18, No. 1, pp. 1-19. (Year: 2024).*

(Continued)

*Primary Examiner* — Brent Johnston Hoover
(74) *Attorney, Agent, or Firm* — Tarolli, Sundheim, Covell & Tummino LLP

(57) ABSTRACT

The present invention refers to a novel system, devices and method for training a neural network model to obtain a fish prediction network capable of predicting a fish presence matrix. The predicted wherein the fish presence matrix may be used to determine fishing grounds. The present invention involves a training phase including collecting catch data (e.g., fish catch attributes or fish presence events) and environmental data for a given/defined first geographical region (a training region) and reference period of time, preparing the collected data in a novel manner, and training a neural network model using the prepared collected data to obtain a highly accurate and robust trained fish-prediction engine. It may involve a second prediction phase including using the trained fish prediction engine to predict a fish-presence matrix for a second geographical region and prediction time interval, wherein the fish presence matrix may reveal favorable fishing grounds.

19 Claims, 7 Drawing Sheets

(56) References Cited

OTHER PUBLICATIONS

Ospici et al., "Prediction of fish location by combining fisheries data and sea bottom temperature forecasting", May 4, 2022, arXiv: 2205.02107v1, pp. 1-12. (Year: 2022).*
Chapman, Michael "Artificial Intelligence Predicts Prime Fishing Spots" Iceland Review (2025).
Jensen, Pal Mugaas "Fishing grounds forecasters net innovation award" (2025) Retrieved from: https://www.fishfarmingexpert.com/artificial-intelligence-fishing-forecasts-greenfish/fishing-grounds-forecasters-net-innovation-award/1904402.
"Greenfish Forecasting Tool Helps Tackle Mackerel's Uncertainty" Fishing Technology (2025).
Sigurdardóttir, Andrea "Predicting catch location with artificial intelligence" mbl.is (2024) Retrieved from: https://www.mbl.is/vidskipti/frettir/2024/09/11/spa_fyrir_um_stadsetningu_afla_med_gervigreind/.
SigurdarÐóttir, Andrea "The nerve-wracking tests of the Icelandic Ice Society" mbl.is (2024) Retrieved from: https://www.mbl.is/vidskipti/frettir/2024/09/13/taugatrekkjandi_profanir_isfelagsins/.
Waycott, Bonnie "'Here to stay and evolving fast': How GreenFish's AI-powered fish-forecasting tech is modernizing commercial fisheries" (2025) Retrieved from: https://www.globalseafood.org/advocate/here-to-stay-and-evolving-fast-how-greenfishs-ai-powered-fish-forecasting-tech-is-modernizing-commercial-fisheries/.

* cited by examiner

METHOD, DEVICE AND SYSTEM FOR PREDICTING A FISH-PRESENCE MATRIX FOR DETERMINING A FISHING GROUND

FIELD OF INVENTION

The disclosure relates to a solution for the fishing industry, in particular, it pertains to systems, devices and methods of a novel training method and trained fish prediction network to predict a fish presence matrix which is used to determine a fishing location.

BACKGROUND

Fisheries, controllers and/or captains of fishing vessels have throughout the years determined where to go for fishing based on a variety of factors, such as historical knowledge and experience or insight, weather forecasts and oceanographic conditions including sea surface temperature maps and ocean currents, regulations, monitoring technologies, communication with other fishermen and economic factors such as fuel costs, market demand and value of catch, e.g., according to amount of catch, species in catch and amount of said species etc.

Static systems for information on fishing grounds have been used to aid fisheries, controllers and/or captains to find fishing grounds, where databases and maps provide static or fixed data about fishing areas. An example of such static systems for information on fishing grounds is the use of static maps and charts display fishing grounds, where important features such as bathymetry (ocean floor topography), fishing zones, marine protected areas, and navigational hazards are disclosed. Also, fishing reports and publications provide static reports and detailed information on fishing grounds, such as fish stock assessments, habitat surveys, and ecosystem analyses. More recently, online portals and websites have become a centralized repository of information to provide access to static data on fishing grounds with regulatory updates and fishing news.

Attempts to provide catch prediction systems and tools available for various fishing grounds have been made, by using a combination of historical data, environmental factors, and predictive modelling techniques to forecast fish abundance and distribution. One example is the use of oceanographic models for simulating physical and biological processes in marine ecosystems, including the nutrient cycling, and the distribution of plankton and fish larvae. Such models may integrate data from satellites movement of water masses, buoys, and oceanographic surveys to predict fish habitat suitability and productivity in different regions. Other attempts include remote sensing technologies such as satellite imagery and unmanned aerial vehicles (UAVs) for providing real-time information on ocean conditions, sea surface temperature, water color, and other environmental parameters.

U.S. Pat. No. 9,195,370B1 is a high-level disclosure for a system and method for leveraging outdoor data such as fishing reports and hunting reports to learn various information about hunting or fishing, wherein an analysis engine may submit a fishing (or hunting) recommendation based on a geographical location of a client terminal. The client terminal may submit reports about catches or sights which are processed by the analysis engine.

CN113836815A discloses a method to obtain a machine-based fishing situation prediction method including steps of obtaining marine environmental factor data and fishery operation data. The data being preprocessed, e.g., to calculate CPUE of each fishery operation area and merging the environmental data and CPUE into a sparse grid with same precisions and generating a sparse training data set and a test data set according to the preprocessed data set. A machine learning model is then trained on the training set and the test set used to evaluate the trained model.

SUMMARY OF INVENTION

An object of the invention is to provide a robust method of training a neural network model to obtain an accurate and realistic prediction model.

Another object of the present invention is to provide solutions (such as system(s), device(s) and method(s)) for determining a fish presence matrix, using a fish prediction network, wherein the fish presence matrix may be used to determine a fishing ground. Thus, the solutions may be used by user (such as an operator of a fishing vessel) to find a place to fish.

Another object of the present invention is to provide more energy-efficient solution (e.g., system, device and method) for determining a fish presence matrix, with the solutions requiring less computational power compared to same purpose methods in the state-of-the-art.

Yet another object of the present invention is to provide an improved fishing vessel and an improved method of fishing, or in particular, an improved method of guiding a fishing vessel to a fishing ground, that is both more rewarding (e.g., in regard to the amount of catch and possible fuel expenditure) and less time-consuming than conventional means of fishing.

The foregoing object and further objects may be attained through the features set out in the claims.

In broad terms, the present invention involves a training phase (i) comprising collecting catch data (e.g., fish catch attributes or fish presence events) and environmental data for a given/defined first geographical region (a training region) and reference period of time, preparing the collected data in a novel and innovative manner, and training a neural network model using the prepared collected data to obtain a trained fish-prediction engine. The present invention may further involve a prediction phase (ii) comprising using the trained fish-prediction engine to predict a fish-presence matrix for a second geographical region and prediction time interval. The predicted fish-presence matrix may be considered to be a forecast for fish catch attributes and/or fish presence (such as quantity, type, quality, etc.), as a function of spatial dimensions and/or time. The Applicant finds that the predicted fish presence matrix is both accurate and will realistically mimic the behavior of the catch/aquatic animals as they travel in the ocean, e.g., when the fish follows ocean currents.

The two phases, (i) and (ii), may be executed at different times and even using different computers that may be remote to each other. For example, the second phase may often be carried out in real-time and on-the-fly.

The fish presence matrix (or information contained therewithin) may be used to determine, or used to aid in determination of, a fishing ground, wherein the determined fishing ground may be chosen based on maximizing the quantity of catch, or species of catch, or quantity of different species, or quality of species, or any combination of the foregoing. As a non-limiting example, a fish-prediction engine may be trained, using a large geographical region and a reference period of time, and later used to carry out predictions e.g., on-the-fly and in real-time, for a second, e.g., a smaller, region and prediction time window. For example, the second smaller region may be a region in proximity to or surrounding a fishing vessel.

The fish-prediction engine may be dynamically updated and/or improved as more catch data becomes available, e.g., through feedback from fishing vessels or fisheries.

The Applicant finds that the present invention provides a more accurate and realistic predictions compared to solutions known in the art. This is achieved by several key differences between the solution of the present invention and the prior art, namely, how the training target is prepared (from the catch data or raw haul data), how the input (from the environmental data) is prepared and how the network is trained. More precisely, the catch data is densified, e.g., by transforming it into a probability field (a sparse catch tensor) using motion-aware interpolation engine (also referred to as motion paths), wherein each haul or catch is expanded into realistic movement paths that detour around land and are subsequently smoothed using radially decaying kernels such as Gaussian or KDE. This densification of the catch data is of pivotal importance for the accuracy of trained network since the catch data is typically very sparse, wherein the data points in the catch data may be both, or either, temporally and spatially far apart. With the solution of the present invention, a fish-presence matrix is obtained which includes an informative signal in majority of the grid cells (of the fish-presence matrix) compared to the 1% non-zero fraction left by raw points. This eliminates the class-imbalance problem that plagues earlier methods. Another factor is how the environmental data layers (also referred to as cubes) are prepared. The environmental data may be stacked from dozens of rasters (i.e., types of data) such as, but not necessarily limited to, sea surface temperature (SST), sea surface height (SSH), wind, chlorophyll, bathymetry. The preparation may automatically pad the data layers such that every spatial dimension is compatible with the convolutional down-sampling schedule. This will guarantee that the neural network model can be trained on small coastal windows without size-zero errors. The training of the neural network model may use weight MSE or Dice/Tversky loss until convergence is reached. The predictor itself (e.g., the trained neural network) may be a 3-D-U-Net with pooling and ConvLSTM blocks to preserve the temporal axis while fine-scale spatial texture is learned; wherein the training may use weighted MSE or Dice/Tversky loss functions until convergence is reached and a trained model is obtained. In combination, these and other innovative features of the present invention may deliver physically plausible predictions, coast-respecting paths and a temporally faithful network, producing approximately 20-30% higher F1 scores and over 50% fewer false-absence alerts along productive fronts compared with state-of-the-art.

Herein the terms “fish” and “aquatic animals” may be used interchangeably. The invention may be equally applicable to any kind of aquatic animal such as fish, mammals and invertebrates. But, in preferred embodiments, aquatic animals may be fish such as pelagic or bottom sea fish. The fish may for example be, but not limited to, cod, or herring, or mackerel, or capelin or blue whiting.

In an aspect of the present invention, a computer-implemented method for training a neural network model to obtain a trained fish-prediction network is provided. The method may also provide using the trained fish-prediction network to predict a fish presence matrix.

The method includes a step of acquiring a plurality of first catch data for a first geographical region over a reference period, the first catch data comprising georeferenced fish catch attributes or fish presence events.

The first geographical region may comprise one or more, preferably, a plurality of a set of geographical coordinates such as, but not limited to, longitude and latitude and optionally depth, defining a geographical region for which first catch data is to be collected/retrieved over a reference period of time. This data may be spatially labelled (i.e., georeferenced) and time/date referenced, and stored in at least one accessible data storage such that the data is retrievable.

The length of the reference period may be days, or a week, or two weeks, or three weeks, or a month, or two months, or three months, or half a year, or nine months or a year, or even several years, or even 10 years, or any value therebetween.

The first catch data comprises one or more fish catch attributes or fish presence events, wherein the fish catch attributes may be one or more of the following: total amount of catch, type (species) of one or more aquatic animals to be fished, relative composition of catch in terms of species, amount of bycatch in catch, a statistical measure of quality of aquatic animals in catch, a statistical measure of size and/or weight of catch, optimal depth of catch, or any combination thereof, and the fish presence events may be where fish are seen/located directly or indirectly by fish-finding-equipment e.g., through sonar devices on fishing or exploration vessels, or through aircraft exploration, or even through satellites, such events may be georeferenced and time stamped and uploaded to at least one accessible data storage.

The georeferenced fish catch or fish presence events is commonly sparsely distributed in either space and time, or both.

The method includes a step of time-aligning and geo-aligning the first catch data on a pre-defined spatial-temporal grid for producing an initial sparse catch tensor.

In useful embodiments, the initial sparse catch tensor may have dimensions (t, k and n), wherein t is the number of discretized temporal points and k×n is the number of spatial points, e.g., latitude and longitude. In some embodiments, depths may be used as well and would introduce a new dimension. In some embodiments, the dimensions may be (t, k, n and j) where j is for different types of fish catch attributes or fish presence events.

The spatial-temporal grid may be defined for a desired geographical region such as the first geographical region and the reference period. The grid is constructed by discretization of the spatial and temporal dimensions to a given resolution. For example, the spatial part of the spatial-temporal grid may be discretized in terms of longitudinal and latitudinal coordinates, and optionally in terms of depth, e.g., to a EPSG:4326 grid. As the skilled person will be aware, any suitable grid dimensions may be chosen often based on the data and/or application. With finer grids, a more accurate fish prediction network may be obtained.

In some embodiments, the grid resolution may be determined from the resolution of the first catch data.

In useful embodiments, the grid resolution of the pre-defined spatial and temporal grid may be selected such that each spatial dimension is an integer multiply of the maximum pooling factor used by the neural network, thereby, avoiding zero-sized feature maps during inference.

As a non-limiting example, in a North-East Atlantic pilot, the grid may have resolution of 180 time points (e.g., as slices in the grid), wherein each time point representing one day and thus a total span of approximately 6 months. The spatial dimensions may be 256 (e.g., as rows)×512 points (e.g., as columns) with a resolution of roughly 4 km spacing in north-to-south and east-to-west leading to an area of approximately 1000×2000 $km^2$ spanned by the data.

Accordingly, in some embodiments, the grid may have temporal resolution of 0.5 day, 1 day, 2 days, 3 days, or 4 days, or 5 days, or 6 days, or 7 days. The total temporal span may be 1 month, 3 months, 6 months, or 9 months, or 12 months, or 18 months, or 24 months, or any value therebetween.

In some embodiments, the grid may have spatial resolution of 0.5 km, or 1 km, or 1.5 km, or 2 km, or 2.5 km, or 3 km, or 3.5 km, or 4 km, or 4.5 km, or 5 km, or 5.5 km, or 6 km, or 6.5 km, or 7 km, or 7.5 km, or 8 km, or 8.5 km, or 9 km, or 9.5 km, or 10 km, The resolution of the north-to-south and east-to-west may be the same or may different from one another.

Raw haul data of first catch data may be snapped/placed to the spatially nearest grid cell (e.g., to the 4 km×4 km spatial grid) with a timestamp rounded to the nearest time point (e.g., 00:00 UTC each day if time resolution is selected as one day), i.e., the raw haul data may be used to populate the sparse tensor using the spatially nearest grid cell and rounded timestamp.

The method includes a step of densifying the sparse catch tensor for generating a training fish-presence matrix, wherein the training fish presence matrix comprises approximate values in grid cells representative of probability of fish catch attributes or fish presence in the grid cells.

The step of densifying the sparse catch tensor may preferably comprise steps of interpolating temporal gaps in the sparse catch tensor (C) using realistic motion paths between consecutive first catch data, and, convolving non-zero grid cells of with at least one radially decaying probability distribution kernel. This will generate a training fish presence matrix (P), from the sparse catch tensor (C), whose values approximate a probability or density of a catch attributes (e.g., species presence) in substantially every grid cell of the training fish presence matrix.

In useful embodiments, the interpolation using realistic motion paths may be interpolated using linear interpolation, Brownian interpolation or waypoint-routed models. In some embodiments, the interpolation is constrained by a land-sea mask to prevent motion paths from crossing land area.

The probability distribution kernel may be at least one of the following: Gaussian kernel, or Epanechnikov kernel, or kernel-density-estimation (KDE) function with a tunable bandwidth. Gaussian and KDE kernels advantageously preserve smooth density peaks, while avoiding ringing artefacts that occur with boxcar kernels. Epanechnikov may advantageously keep computation cheap for real-time use.

As discussed above, by densifying the sparse catch tensor (C), it will advantageously and drastically improve the accuracy of the trained network, wherein a fish-presence matrix is obtained which includes an informative value/signal in majority of the grid cells (of the fish-presence matrix) compared to the 1% non-zero fraction left by raw points. Furthermore, this renders a more robust model with the class-imbalance problem, known to affect similar methods in the art, eliminated.

In some useful embodiments, the kernel values may be truncated above a percentile-based ceiling. This will advantageously serve to mitigate outlier influence in the convolution of the non-zero grid cells, which could otherwise slightly decrease the accuracy of the trained model.

The method includes a step of acquiring first environmental data layers for the first geographical region and over the reference period.

The first environmental data layers (also referred to as environmental rasters or simply as rasters) comprising environmental data. The first environmental data layers or data may be weather or meteorological data, marine biological data and oceanographic data.

In some embodiments, the weather data may comprise one or more of the following: wind direction, wind speed, ocean wave height and ocean wave speed.

The marine biological data may comprise one or more of the following: concentration of chlorophyll in the water, concentration of dissolved inorganic carbon in the water, concentration of oxygen in the water, concentration of nitrate in the water, concentration of phosphate in the water, concentration of phytoplankton in the water, concentration of zooplankton in the water, concentration of silicate in the water, pH levels, sinking molar flux of particulate organic matter, surface partial pressure of carbon dioxide in sea water and volume attenuation coefficient of downwelling radiative flux in the water.

The oceanographic data may comprise one or more of the following: sea water velocity, model level number at sea floor, sea ice velocity, sea floor depth, sea surface height above geoid, sea ice albedo, sea surface wave strokes drift velocity, sea water potential temperature, sea water potential temperature at sea floor, sea water pressure at sea floor and sea water salinity.

In useful embodiments, the environmental data or data may comprise one or more of the following: surface temperature, chlorophyll concentration, surface currents, bathymetry and wind stress, or any combination of two of these, or of three of these, or of four of these, or of all of these.

The method may include a step of matching the first environmental layers to the same grid as the first catch data, i.e., wherein the environmental layers are re-projected to the same grid (e.g., EPSG:4326 grid). This may involve a step of temporal and/or spatial interpolation using one or more interpolation techniques such as, but not limited to, bilinear interpolation. Each environmental layer or raster will therefore share the exact (row, column, time) coordinates as the training fish-presence matrix. This may serve to simplify channel-wise concatenation.

The method includes a step of stacking the environmental layers together with the training fish-presence matrix (P) to form a training data cube (X). The training data cube later being used to train a neural network model as described below.

In some embodiments, the step of stacking the environmental layers together with the training fish-presence matrix (P) may be carried out along a channel dimension to form a training data cube (X).

In some embodiments, the method may further include a step of temporal aggregation of consecutive daily first catch data into multi-day composites prior to the step of training the neural network model, e.g., by the rolling window method.

The method includes a step of training a neural network model by supplying the training data cube (X) as an input and using the training fish-presence matrix (P), or a loss-scaled variant thereof, as a target, for producing a trained fish-prediction network.

In useful embodiments, the step of training the neural network model may include iteratively supplying the training data cube (X) as an input and the training fish-presence matrix (P), or a loss-scaled variant thereof, as a target, while minimizing a differentiable loss function therebetween, such as weighted mean-squared error, until the loss is below a predetermined threshold. The weighted MSE advantageously emphasizes rare but important positive cells (or elements), boosting recall without harming precision compared to plain MSE.

The neural network model may be selected as one or more of the following: a 3D convolutional neural network (CNN), a convolutional LSTM network, a hybrid CNN transfer. In some embodiments, it may be selected as an ensemble of any two of the foregoing, or of all three models.

In some embodiments, the step of training the neural network model may further comprise using an early stopping criterion based on a validation set. The early stopping criterion may serve to prevent over-fitting of the model.

In some useful embodiments, the method may further comprise a step of applying sigmoid activation during training such that P' yields values in the closed interval [0,1] and may thus be interpreted probabilistically. The sigmoid may be applied during the final layer during training and inference so that the output will be directly interpretable as probability.

In useful embodiments, the method may further include a step of storing the trained fish-prediction network in a data storage.

Once trained, the trained fish-prediction network may receive unseen input data to predict (also referred to as "to infer") a predicted (i.e., a inferred) fish presence matrix for a region spanned by the input and corresponding to the input interval of time data. The fish-prediction network may hence advantageously be used repeatedly to make different predictions without retraining the model on-the-fly and in real-time. Furthermore, with more training data available (i.e., catch and fish-presence data and environmental data) the network may be dynamically updated by re-training. This updating may be carried out continually as more data is obtained/received and/or as time passes.

The fish-prediction network may thus be deployed or integrated into an accessible system capable of receiving real-time input data and make predictions in real-time, on-the-fly. Accordingly, the method may comprise a step of deploying the trained fish prediction network to an accessible system. This deployment system may be separate to the system used for training. This way, the heavy lifting of the neural network may be moved into one-time, offline preprocessing, to deliver comparable or better accuracy while running on lighter hardware at inference time.

The method may also include a step of deploying the trained fish-prediction network to an accessible computational device.

The method may also include a step of receiving or retrieving a second geographical region and a prediction time interval.

The second geographical region may comprise one or more, preferably, a plurality of a set of geographical coordinates such as, but not limited to, longitude and latitude and optionally depth, defining a geographical region for which a prediction/inference is to be made. As a non-limiting example, the second geographical region may be a subset within the first geographical region, i.e., to be within the boundaries of the first geographical regions. In other examples, the second geographical region may even be the same as the first geographical region.

The prediction time interval is the interval of time for which a second fish presence matrix is to be determined/forecasted. It may be a single period of time expressed in minutes, preferably in hours, more preferably in days, or in weeks such as 1 week or 2 weeks or even in months such as 1 month or 2 months. As a non-limiting example, the prediction time interval may be 1 day, or 2 day, or 3 day, or 4 day, or 5 day, or 6 day, or seven-day period.

The method may include a step of acquiring second environmental data layers for the second geographical region over the prediction time interval and stacking them to form an inference data cube (X').

The second environmental data layers comprising environmental data. The second environmental data layers or data may be weather (meteorological data), marine biological data and oceanographic data, as discussed above in relation to the first environmental data layers or data. In useful embodiments, the environmental data or data may comprise one or more of the following: surface temperature, chlorophyll concentration, surface current, bathymetry and wind stress, or any combination of two of these, or of three of these, or of four of these, or of all of these. The data may include one, or both of, historic data and forecasts of environmental data such as weather biological data and/or oceanographic data. An advantage of this is that forecasted environmental data may be highly accurate, e.g., weather data due to advancement in meteorological and oceanographic prediction models, and by using forecasts one can obtain yield more accurate fish presence matrices for the prediction interval compared to using only historic data.

The second environmental data layers preferably include the same type of environmental data as selected for the first environmental data layers.

The method may include a step of down-sampling or up-sampling the second environmental data layers to the same grid as discussed above, or a subset thereof. The timestamps may be truncated to the nearest time point, e.g., if one day is selected as the time resolution, the data may be temporally truncated to midnight of each day such that each slice represents one UTC day.

The method may include a step of applying the trained fish-prediction network to the inference data cube (X') for inferring a fish-presence matrix (P') representing at least one fish catch attributes or fish-presence events for each grid cell of the second geographical region over the prediction interval.

The fish-presence matrix may comprise one or more fish catch attributes or fish-presence events as a function of temporal and spatial coordinates. It may comprise one or more of the following: total amount of catch, type (species) of one or more aquatic animals to be fished, relative composition of catch in terms of species, amount of bycatch in catch, a statistical measure of quality of aquatic animals in catch, a statistical measure of size and/or weight of catch, optimal depth of catch, fish-presence, or any combination thereof.

The method may further comprise a step of selecting the type of fish catch attributes and/or fish presence events and/or receiving the type of selection for the fish catch attributes and/or fish presence events. In such embodiments, the method may comprise a step of filtering the fish-presence matrix according to the selection.

The method may include a step of using the fish-presence matrix (P') to determine a fishing ground. The fish-presence matrix may be the filtered or unfiltered fish-presence matrix.

In some embodiments or applications of the present invention, the training phase and all steps leading up the training phase may be performed at different times to the inference/prediction phase, i.e., the trained fish prediction network may be stored in at least one data storage and used at a later time to make inference for a second geographical region and prediction time interval.

In useful embodiments, the trained fish prediction network may be deployed to a computational device/client terminal and used to make predictions, e.g., from input of a second geographical coordinate and a prediction time interval, i.e., the trained fish prediction network is deployed on the same computational device as is used to make predictions.

In other embodiments, the training may be deployed to a separate and accessible computational device which may be accessible to a client terminal, i.e., the deployment device is separate from the training device, the prediction device and the client terminal. In such embodiments, the method may further include a step of receiving a second geographical region and a prediction time interval from a client device and the method may further comprise a step of returning the fish-presence matrix (P') to the client device.

The step of using the fish-presence matrix (P') to determine a fishing ground and/or the step of outputting the fish-presence matrix may comprise a step of preparing output data such as visual graphics such as contour or surface plots representing the fish presence matrix (P') as a function of spatial and time coordinates. Alternatively, or additionally, it may comprise a step of preparing output data such as textual data such as tables, wherein rows and column may represent spatial coordinates and number of table may represent time. In some embodiments, a user may manually identify/determine, from the output data, a fishing ground. In other embodiments, the fishing ground may automatically be determined using statistical and/or optimization methods.

The fishing ground may comprise at least one spatial coordinate (i.e., longitude and latitude, and optionally depth) and at least one time, or an interval of time. In some applications it may be a set of spatial coordinates representing a region, and at least one time or an interval of time. The fishing ground will represent a region and time wherein fishing an aquatic animal is forecasted to be favorable according to the first catch data comprising any of the fish catch attributes or fish presence events, e.g., type of aquatic animal, quantity, size, quality etc.

The method may further comprise a step of providing a fishing vessel with a fish presence matrix.

The method may further comprise a step of instructing an operator to navigate a fishing vessel to a fishing ground determined from the fish presence matrix.

Advantageously, the present invention may, therefore, be used to predict at least one fishing ground for a specific type of aquatic animal such as cod based on quantity of said cod as a function of geographical coordinates (e.g., longitudinal and latitudinal coordinates) and time and/or date, or interval thereof, and hence guide at least one fishing vessel towards the at least one fishing ground comprising an abundance of cod. In another embodiment, said system(s) and/or method(s) might be used to predict at least one fishing ground for quantity of a specific type of an aquatic animal with a large statistical estimate in size/or weight or with high degree of quality. Moreover, the present invention may be used to minimize environmental impact, e.g., by minimizing fuel usage of at least one fishing vessel or by minimizing the amount of bycatch which is usually discarded. As a non-limiting example, the present invention may provide at least one fishing vessel with the optimal geographical locations (i.e., at least one predicted fishing ground) for fishing such that said at least one fishing vessel may take the shortest path between two or more predicted fishing grounds and hence minimize the fuel usage while maximizing the amount of catch according to given catch selection. Moreover, the present invention enables tracking of the movement of at least one predicted fishing ground as a function of time and/or date.

In one aspect of the present invention, a (non-transitory) computer readable medium storing instruction which, when executed by at least one processor unit, performs the method for training a neural network model to obtain a trained fish-prediction network or any embodiment thereof, as described herein, or any combination of embodiments. The instructions may further comprise steps of predicting a fish presence matrix, as described herein, or any embodiment thereof.

In one aspect of the present invention, a system for training a neural network model to obtain a trained fish-prediction network, is provided. The system may further provide a system for predicting a fish presence matrix using the trained fish prediction network.

The system comprises a server-side training and/or prediction engine, wherein the server-side training and/or prediction engine comprises: at least one processor unit; and, a non-transitory memory storing instructions which, when executed cause the at least one processor to perform the method for training a fish presence network and/or using the trained network for predicting a fish-presence matrix (P') or any embodiment thereof, as described herein, or any combination of embodiments, and to return a fish-presence matrix covering a (preferably a user-defined) second geographical region and a prediction time interval.

In some embodiments, the server-side training and/or prediction engine may comprise at least one computational unit comprising at least one processing unit wherein the at least one processing unit is configured to both train the neural network model to obtain a trained fish-prediction network and to use the trained fish-prediction network to make inference about a fish-presence matrix (P'). The at least one computational unit then being communicatively coupled to or accessible, e.g., through a network, by at least one client terminal. In other useful embodiments, the server-side training and/or prediction engine may comprise one or more connected computational units, e.g., connected by a network, that may be remote to each other. At least one computational unit configured to train the neural network model and another at least one computational unit configured to make inference on a fish-presence matrix. In such embodiments, the neural network model may be trained on at least one computational unit of the server-side training and/or prediction engine and then deployed in a production environment communicatively coupled or accessible to at least one client terminal. In such embodiments, the server-side prediction engine may comprise at least one computational units specifically designed to train a neural network model, e.g., a cluster of computational units.

The system further comprises a client terminal configured for data exchange with the server-side training and/or prediction engine, wherein the client terminal includes at least one processor unit and a non-transitory memory storing instructions which, when executed cause the processor to receive, from the training and/or prediction engine a fish-presence matrix or receive, from the training and/or prediction engine, a trained fish prediction network and using the received trained fish prediction network to predict a fish presence matrix using a second geographical region and a prediction time interval;

The system, preferably the client terminal of the system, further comprises an output means configured to present the fish-presence matrix to a user such as in the form of visual graphics or as textual data. The client terminal may comprise a graphical user interface to display the fish-presence matrix.

In some embodiments, the client terminal may further comprise instructions of filtering the fish-presence matrix to one or more user selected fish catch attributes or fish presence events. As a non-limiting example, the user may select to maximize the quantity of catch and a target species. Another non-limiting example, the user may select to maximize the quantity of total catch. In some applications, the user may also want to minimize by-catch. Yet another non-limiting example, the user may select to maximize the quality of catch and a target species.

The client terminal may be a tablet, a phone, or a computer, or any other suitable electronic device comprising a processor, a memory and output means. In some embodiments, the client terminal may be coupled to the navigation system of a fishing vessel. In some embodiments, the client terminal may be a part of the computational system, in particular, the navigation system of the fishing vessel.

In an aspect of the present invention, a fishing vessel is provided.

The fishing vessel comprising the system for predicting a fish-presence matrix for determining a fishing ground or at least the client terminal of the system, wherein the client terminal is in communication (or communicatively coupled) with the server-side training and/or prediction engine of the system. The system, and the client terminal thereof, are as described in the foregoing and the following, or any embodiment thereof, or any combination of embodiments. The server-side training and/or prediction engine may thus be at a remote location to the fishing vessel, communicatively coupled through a network, wherein the client terminal and server-side training and/or prediction engine are allowed to exchange data. The communication may be carried out through a wireless data link.

In some useful embodiments, the client terminal of the fishing vessel may be integrated with or connected to an electronic chart display or an automatic navigation system of the vessel. In such embodiments, the client terminal of the fishing vessel may transmit the fish-presence matrix, or data thereof, to the electronic chart display. In some embodiments, the electronic chart display may be configured to overlay or superimpose a visual representation of the fish-presence matrix on the electronic chart. In other embodiments, the client terminal of the fishing vessel may transmit the fish-presence matrix, or data thereof, such as a geographical position and/or a time interval that is determined to be a fishing ground to the automatic navigation system.

The skilled person will understand that the phrase “fishing vessel” may cover any vessel configured for fishing operations, i.e., a broad category of fishing boats or ships designed, equipped, and used for fishing operations, whether inland or at sea, may be encompassed by the term “fishing vessel”. It is not limited to any particular type or size. It may for example be, but not limited to, a trawler, a longliners, seiners, or even small-scale boats.

In an aspect of the present invention, a method of guiding a fishing vessel to a fishing ground using a fish presence matrix is provided.

The method includes a step of executing, at a server side training and/or prediction engine, the method according for training a neural network model to obtain a trained fish prediction network and/or predicting a fish presence matrix, or any embodiments thereof, so as to infer a fish presence matrix for a specified prediction time interval and a second geographical region or to receive or to train a neural network model to obtain a trained fish prediction network.

The method includes a step of receiving, by a terminal client onboard a fishing vessel and wherein the terminal client is communicatively coupled to the training and/or prediction engine, the fish presence matrix or receiving, by a terminal client onboard a fishing vessel and wherein the terminal client is communicatively coupled to the training and/or prediction engine, the trained fish prediction network and using the trained fish prediction network to infer a fish presence matrix with a second geographical region and a prediction time interval as input; and, The method may include a step of inputting, to a client terminal on board the fishing vessel, a prediction time interval and second geographical coordinates. The method of inputting may be carried out manually by a user through an I/O interface such as a keyboard or a mouse. In such embodiments, a user may type in a set of geographical coordinates for defining a second geographical region into a graphical user interface, or simply drag the mouse cursor over a region on a map visualized in the graphical user interface for defining a second geographical region. The training and/or prediction engine time interval may be typed through a keyboard or selected using a mouse and e.g., a calendar or a scroll bar in the graphical user interface. In some alternative embodiments, the second geographical region and prediction interval may be pre-determined for or assigned to the fishing vessel, in such the pre-determined second geographical region and prediction interval are automatically inputted to the client terminal.

The method may include a step of transmitting, to a server-side training and/or prediction engine connected to the client terminal, the second geographical coordinates and the prediction time interval. The client terminal is communicatively coupled to a server-side training and/or prediction engine, e.g., through a network such as the internet, VPN, or WAN, allowing the client terminal to transmit the inputted data to the server-side training and/or prediction engine.

The method includes a step of outputting the fish presence matrix to a user. The step of outputting the filtered (see below) or unfiltered fish presence matrix may comprise outputting the fish presence matrix (P') in a form of textual data such as, but not limited to, in one or more tables with columns and rows assigned by spatial dimensions and wherein the number of tables is assigned by points in time, or alternatively and additionally as a visual representation that may be a function of spatial dimensions (e.g., 2D contour or surface plots for each point in time) or spatial dimensions and time (e.g., 3D contour or surface plots). More particularly, such a step of outputting may be carried out through creating and displaying a visual representation of the fish-presence matrix, or alternatively, or additionally, as a textual representation of the fish-presence matrix. The fish-presence matrix (P') is fundamentally a multidimensional array indexed by spatial and temporal coordinates, with each entry containing probability or density values for one or more fish catch attributes. Although mathematical in structure, the matrix is presented to the user in an accessible form, typically rendered as contour or surface plots overlaid on a map within a graphical user interface, allowing spatial and temporal patterns of fish distribution to be visualized directly. Alternatively, the same information may be expressed as tables, where rows and columns correspond to grid coordinates and successive tables represent different time slices. The output may be displayed on the GUI of a client terminal or integrated into the electronic chart display of the navigation system, thereby enabling the fish-presence matrix to be perceived as a navigable fishing map rather than a raw numerical dataset.

The method may include a step of identifying a fishing ground using the fish presence matrix. The identification may be carried out, on the basis of the outputted (filtered) fish presence matrix, a fishing ground. In some useful embodiments, the step of identifying a fishing ground from the fish presence matrix may be carried out automatically, e.g., through optimization or by finding one or more maximum values in the fish presence matrix.

The method includes may include a step of navigating, either manually or automatically, the fishing vessel to the fishing ground and carrying out fishing operations, either manually or automatically, at the fishing ground.

In some embodiments, the method may include a step of selecting at least one fish catch attribute or fish presence event attribute and filtering the fish presence matrix (P') according to the selection. This is particularly useful if the training and/or prediction engine was trained on a plurality of fish catch attributes or fish presence events, e.g., two or more of the following: quality, quantity, size, weight, by-catch etc. In some embodiments, the selection may be carried out manually by a user. In such embodiments, it may be carried out e.g., by selecting specific attributes or fish presence events in the graphical user interface, e.g., by a drop-down menu or by checking boxes.

The invention may find use for commercial fishing and aquaculture industries e.g., to predict where fish or other aquatic animals are likely to be found in large marine environments such as a sea or an ocean. The invention geolocates promising fishing grounds in advance, e.g., hours, days or even weeks in advance for a particular region. This allows fishing vessels to optimize routes to e.g., safe time, cut fuel consumption, maximize quantity of catch, steer vessel toward a target species to reduce by-catch. The invention may also be useful to help set and enforce harvest limits to protect vulnerable species or populations in the sea or ocean.

BRIEF DESCRIPTION OF FIGURES

The foregoing embodiments, features and advantages of the invention will be apparent from the following more particular description of particular embodiments of the invention, as illustrated in the accompanying drawings. The drawings are not necessarily to scale, emphasis instead being placed upon illustrating the principles of the invention.

FIG. 2 shows a visual representation of four different environmental layers for a given time slice for the same spatial area in the North Atlantic.

DETAILED DESCRIPTION

In the description below, it will be appreciated that variations to the embodiments of the invention can be made while still falling within the scope of the invention. The exemplary embodiments are merely intended to better illustrate the invention and should not indicate a limitation on the scope of the present invention. Features disclosed in the specification, unless stated otherwise, can be replaced by alternative features serving the same, equivalent, or similar purpose.

Figure 1:
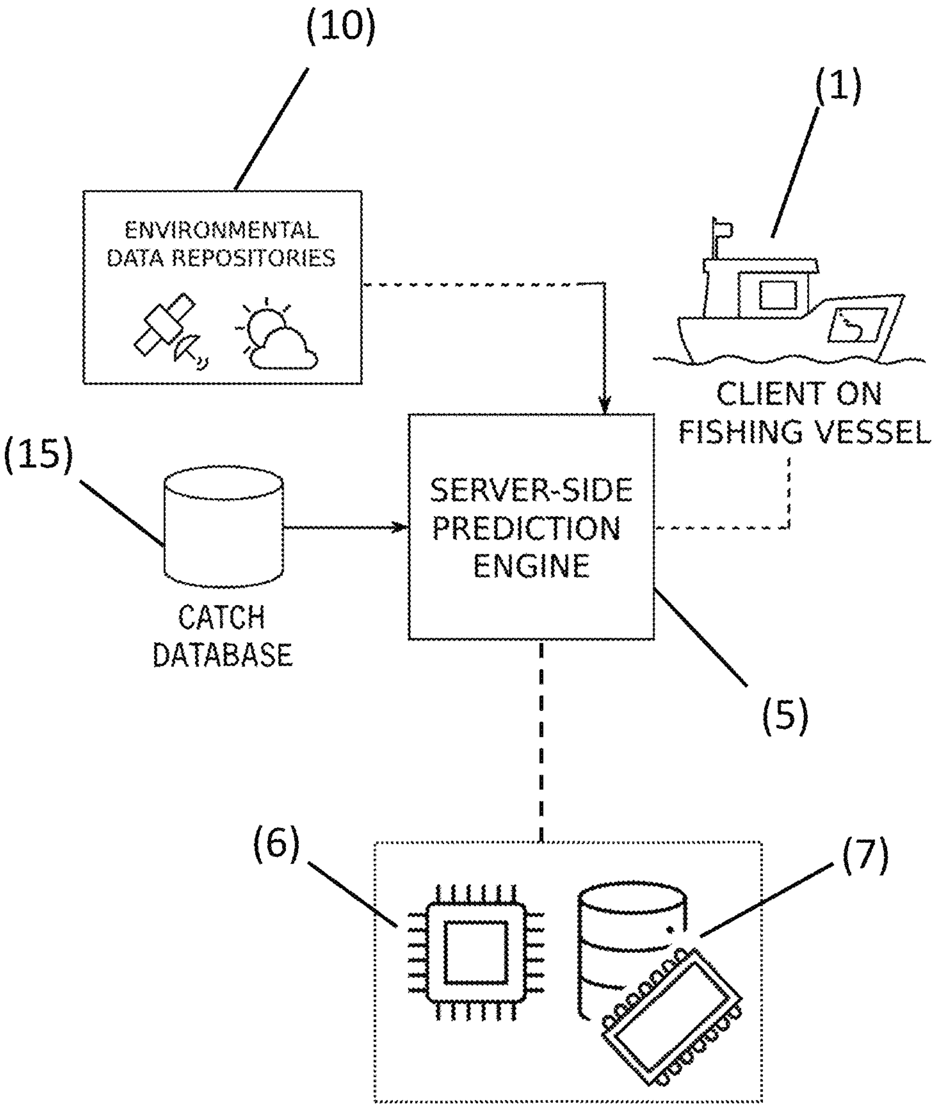
FIG. 1 shows a schematic drawing of an embodiment of a system in accordance with the present invention, wherein a client terminal is arranged on a fishing vessel and the client terminal being communicatively coupled with a server-side training and/or prediction engine configured to predict a fish-presence matrix.
Figure 2A:
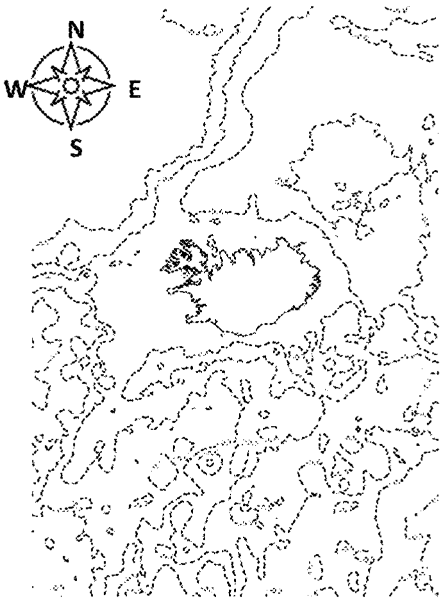
FIG. 2*a* shows sea surface height (in m).
Figure 2B:
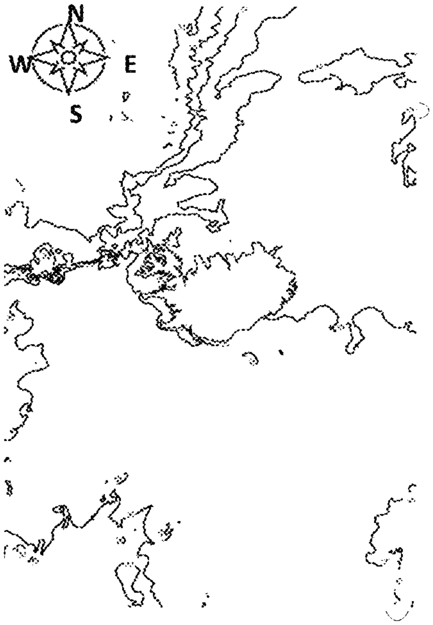
FIG. 2*b* shows salinity (g per kg).
Figure 2C:
FIG. 2*c* shows sea water velocity (m/s).
Figure 2D:
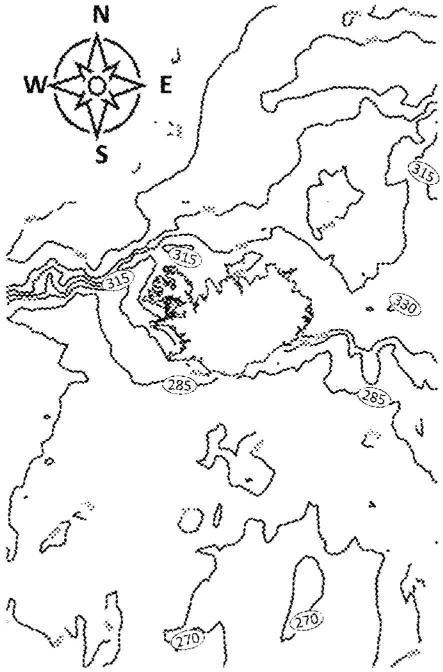
FIG. 2*d* shows $O_2$ (mmol/m3).

FIG. 1 is a schematic drawing of a system for predicting a fish-presence matrix that is used to determine a fishing ground. The system includes a client terminal (1) arranged on a fishing vessel and a server-side training and/or prediction engine (5) configured to predict a fish-presence matrix.

The system may include at least one data storage for storing environmental data (10) comprising meteorological data and/or oceanographic data and/or marine biology data. The at least one data storage being accessible by the server-side training and/or prediction engine and the data therein retrievable by the server-side training and/or training and/or prediction engine. Additionally, or alternatively, the at least one data storage may be external to the system (i.e., not part of the system) but accessible by the server-side training and/or prediction engine and the data therein retrievable. The environmental data may include one or more of the following: surface temperature, chlorophyll concentration, surface current, bathymetry and wind stress. Visual representation of environmental data after preparation of the environmental data (as described herein) is shown in FIGS. 2*a*-2*d* for a given first (or second) geographical region and a single time slice.

The system may include at least one data storage for storing catch data (15) comprising first catch data. The at least one data storage being accessible by the server-side training and/or prediction engine and the data therein retrievable by the server-side training and/or prediction engine. Additionally, or alternatively, the at least one data storage may be external to the system (i.e., not part of the system) but accessible by the server-side training and/or prediction engine and the data therein retrievable.

The client terminal (may also be referred to herein as "a client", "client-side processing device", "a client device" or the like) arranged on the fishing vessel is communicatively coupled with the server-side training and/or prediction engine. In useful embodiments, the client terminal may be arranged on the fishing vessel, and e.g. connected to the navigation system of the fishing vessel. The server-side training and/or prediction engine may be remote to the fishing vessel. In such embodiments, the server-side training and/or prediction engine may advantageously serve one or more fishing vessels simultaneously in real-time. Alternatively, the server-side training and/or prediction engine may also be arranged on the fishing vessel.

The server-side training and/or prediction engine may include at least one processor unit (6) and a (non-transitory) memory (7), shown as an inset in FIG. 1, storing instructions which, when executed cause the at least one processor to carry out the computer-implemented method for training a neural network model to obtain a fish presence matrix and/or for predicting a fish-presence matrix is provided, or any embodiment thereof, or any combination of embodiments thereof, and to return, in response to a query (from the client terminal), or transfer without prompt/query a fish-presence matrix covering a user-defined second geographical region and a prediction time interval.

The at least one processor unit may be a centralized processing unit disposed on a single server at a single location or alternatively may be implemented in a distributed manner across a plurality of servers located at different sites.

In such embodiments, there may be significant time latency between different steps of the computer-implemented method, for example, the training part of the method to obtain a trained fish prediction network may be executed at a different date and/or time as the prediction part of the method to obtain a fish-presence matrix.

In some embodiments, the engine may push the fish-presence matrix to the client terminal on the fishing vessel, e.g., through periodic updates.

The client terminal may be configured for data exchange (i.e., be communicatively coupled) with the server-side training and/or prediction engine, the client terminal includes at least one processor unit, a (non-transitory) memory storing instructions which, when executed cause the processor to transmit a query comprising the second geographical region and the prediction time interval, and, receive from the training and/or prediction engine the fish-presence matrix. Alternatively, the client terminal may include memory storing instructions which, when executed cause the processor to receive a fish presence matrix from the training and/or prediction engine without prompting the training and/or prediction engine to do so, i.e., without sending a query.

In some embodiments, the client terminal may include at least one processor unit, a (non-transitory) memory storing instructions which, when executed, cause the processor to carry out a method of predicting a fish presence matrix using a trained fish prediction network with second geographical region and prediction time interval as input. In such embodiments, the trained fish-prediction network may be trained on the server-side training and/or prediction engine and uploaded, or be accessible, or deployed to the client terminal.

The client terminal may thus allow a user to select a second geographical region defined by a set of one or more geographical coordinates and a prediction time interval defined by a set of one or more dates and/or times. The client terminal may further allow a user to select type of data (i.e., the user selected fish catch attributes) to be filtered from the fish-presence matrix, e.g., quantity, type of fish, quality, minimize fuel consumption, minimize by-catch etc. Filtering may be performed by applying attribute-specific masks or selection operators on the predicted fish-presence matrix (P'). Each grid cell contains probability or density values for one or more fish catch attributes (species, weight, quality indices, by-catch probability, etc.). When a user selects a filter (e.g., "maximize mackerel, minimize by-catch"), the system extracts only the relevant attribute channels, applies thresholding or weighted scoring, and discards non-selected attributes. The result is a reduced matrix highlighting only the chosen criteria.

Figure 3:
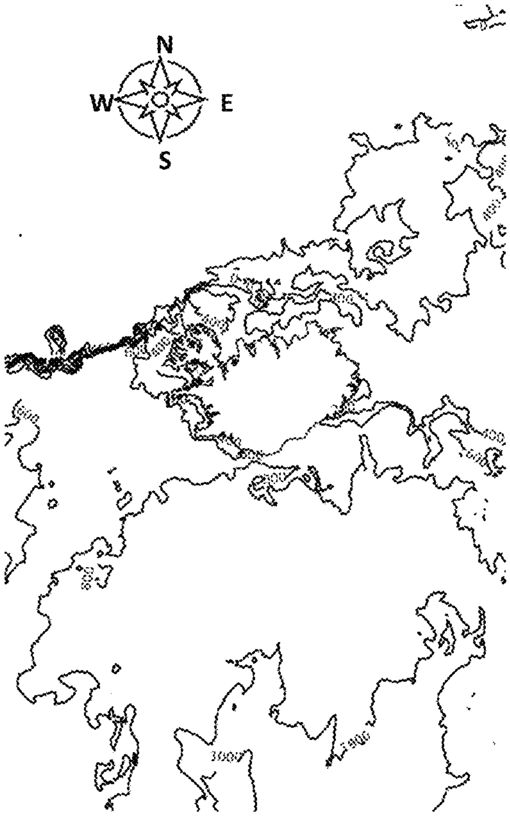
FIG. 3 shows a typical visual representation of a inferred fish presence matrix for a given time slice and the same spatial area, as in FIG. 2, in the North Atlantic. In this representation, the at least one fish catch attribute was selected as total amount of fish (in kg) to be fished (a function of space and time).

The client terminal may further include an output means configured to present the fish-presence matrix to a user or transfer it to another device such as another client device. The presentation may be textual or visual representation of the fish-presence matrix. The visual or textual representation may be displayed on a screen through a graphical user interface (GUI). FIG. 3 shows an example of a visual representation of the fish-presence matrix, wherein the fish catch attribute is quantity of fish to be fished.

Figure 4:
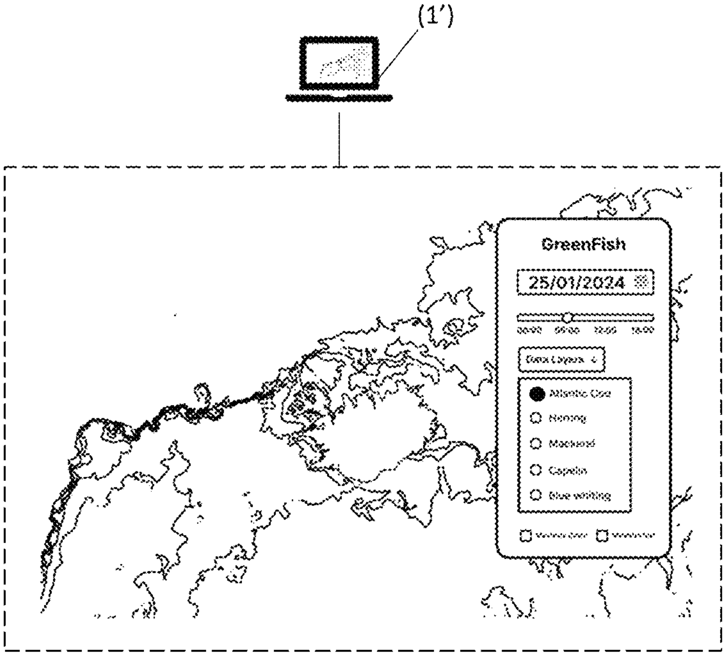
FIG. 4 shows a graphical user interface that may be displayed by a client terminal, in accordance with the present invention, and allowing a user to selected date and time of day, type of fish (Atlantic code, herring, mackerel, capelin, blue whiting) and quantity to be fished of the type of fish, and to maximize catch and/or to minimize fuel.

Referring to FIG. 4, which shows a prototypical GUI that may be displayed by the client terminal and allows a user to selected date and time of day, type of fish (Atlantic code, herring, mackerel, capeline, blue whiting) and quantity to be fished of the type of fish, and to maximize catch and/or to minimize fuel. In this embodiment, the user selection is simply used to filter out the relevant output data from the fish presence matrix.

Alternatively, or additionally, the visual representation of the fish-presence matrix may be supplied to and displayed on the electronic chart display of the automatic navigation system of the fishing vessel.

In some embodiments, the client terminal may be integrated into the fishing vessel and connected with the computation system of the fishing vessel, in particular, to the navigation system of the fishing vessel, i.e., the client terminal and the navigation system being communicatively coupled.

Figure 5:
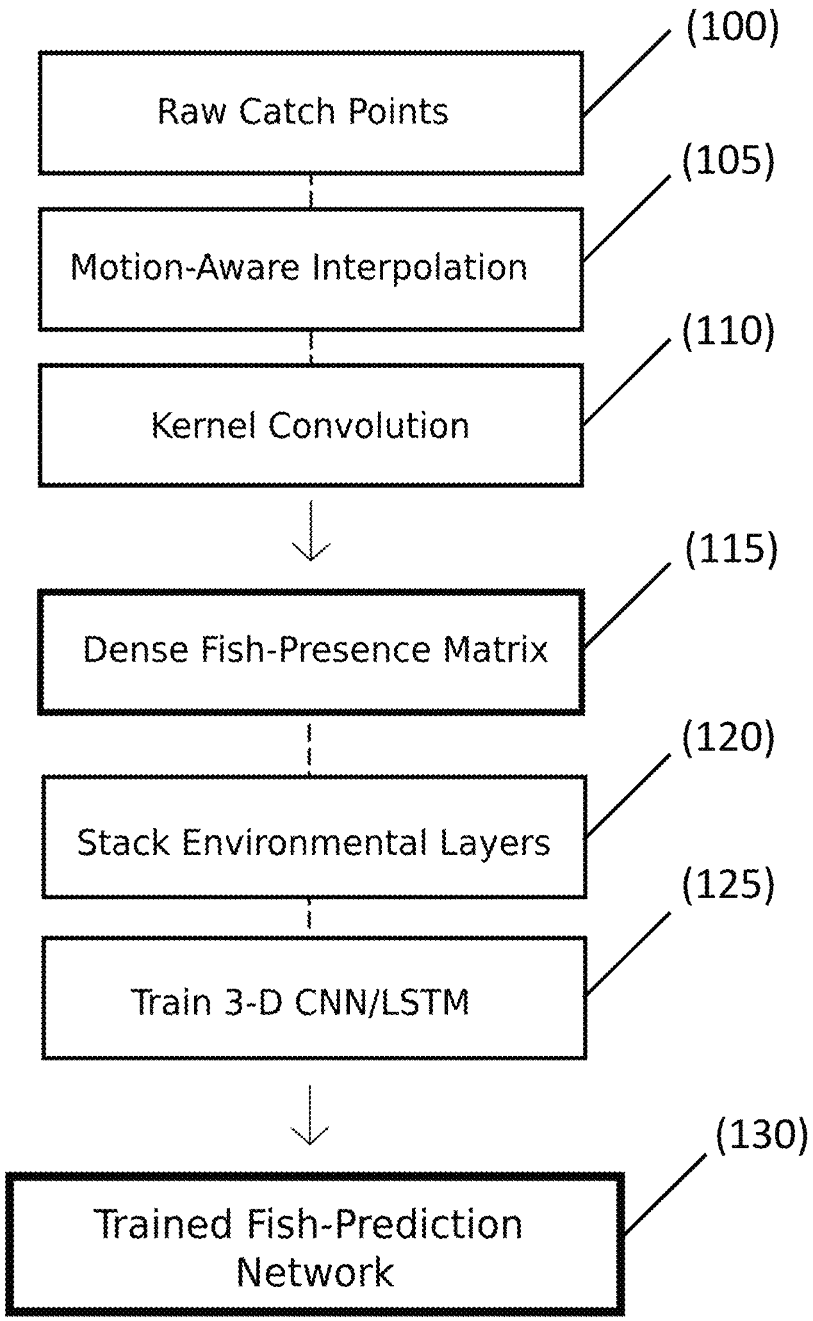
FIG. 5 shows a flowchart illustrating an embodiment of a method for producing a trained fish-prediction network in accordance with the present invention.

FIG. 5 shows a flowchart illustrating an embodiment of a method for producing a trained fish-prediction network (130).

The method includes a step of acquiring (which may be requested or received from at least one internal or external data storage) a plurality of first catch data (or raw catch points) (100) for a first geographical region and over a reference period, the first catch data comprising a georeferenced fish catch attributes or fish presence events (also referred to as raw catch points) such as, but not limited to, type of fish, quality of fish, quantity of fish.

This data may be time- and geo-aligned on a predefined spatial and temporal grid to produce an initial sparse catch tensor (not shown). The sparse catch tensor (C) consists of raw haul data mapped to a predefined spatio-temporal grid. Its dimensions are (t, k, n, j) where t=time steps, k×n=spatial grid (latitude× longitude, optionally depth), and j=fish catch attributes (e.g., species, weight, by-catch). Each non-zero entry corresponds to one or more catch events in that grid cell and time slice, while most other entries remain zero.

The method includes a step of densifying the sparse catch tensor. This step may include steps of motion-aware interpolation (105) which traces vessel paths around land and kernel convolution (110) which spreads each, or group of, raw haul data (also referred to as raw catch data or haul data) into a smooth field.

The motion-aware interpolation includes interpolating temporal gaps for producing motion paths between consecutive first catch data. In some embodiments, this may be achieved by using linear interpolation, Brownian interpolation, or waypoint-routed models. Furthermore, in useful embodiments, the interpolation may be constrained by a land-sea mask to prevent motion paths from crossing land area.

Motion paths are calculated by filling temporal gaps Δt between successive catch events. Given two points ($x_1$, $y_1$, $t_1$) and ($x_2$, $y_2$, $t_2$), the path is parameterized over Δt. Linear interpolation computes straight-line steps; Brownian interpolation perturbs each step by Gaussian noise proportional to Δt; waypoint-routed interpolation uses shortest-path algorithms (e.g., A*with a land-sea mask) to find feasible sea routes.

The kernel convolution may include convolving non-zero grid cells with at least one radially decaying probability distribution kernel, wherein the probability distribution kernel may comprise one or more of the following: Gaussian kernel, Epanechnikov kernel, kernel-density-estimation (KDE) function with a tunable bandwidth. Furthermore, the range of the radial decay may be predefined or obtained by fit.

After motion-aware interpolation, the tensor contains filled tracks. Kernel convolution is then applied: each non-zero entry is replaced with values from a radially decaying kernel distributed over neighboring cells in space-time. The convolution sums overlapping kernels, producing continuous probability fields. The result is the densified fish-presence matrix (P), where each grid cell holds a probability (0-1) or density value of fish presence (115).

Figure 6:
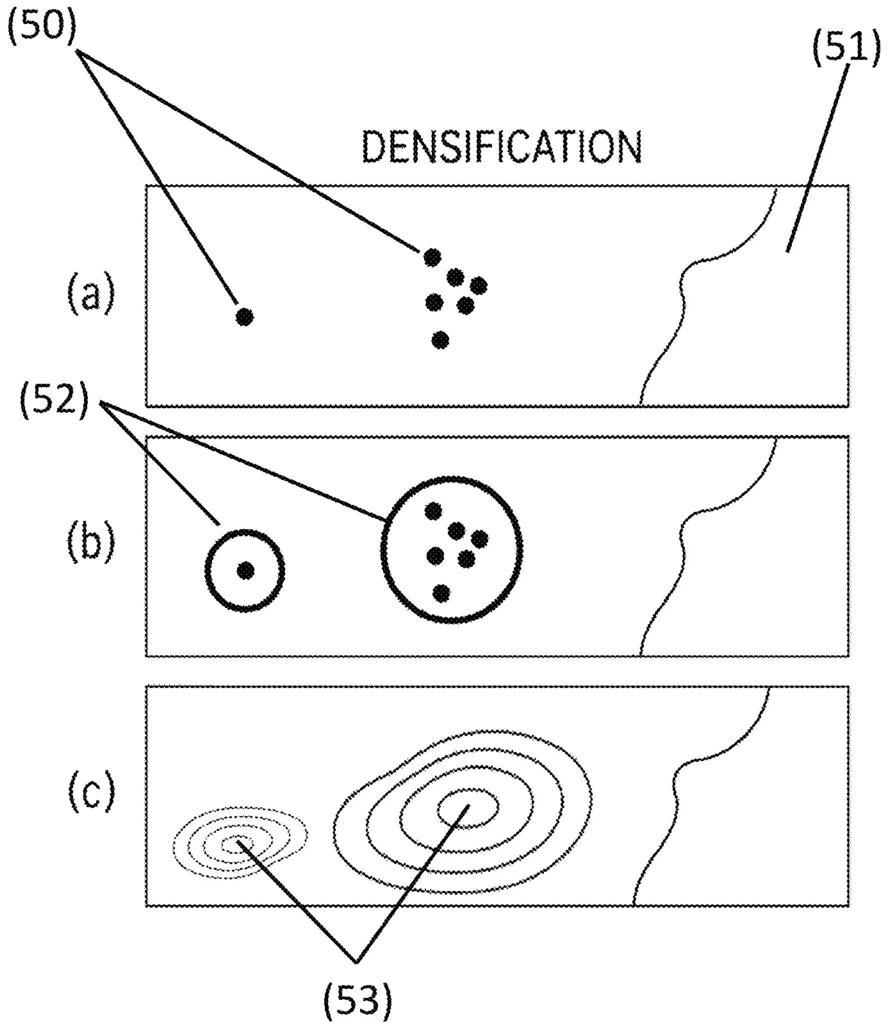
FIG. 6 shows a schematic drawing of step-wise densification of the sparse catch tensor, in accordance with the present invention.

Referring to FIG. 6 which shows a visual representation of how densification of the sparse catch tensor (C) may be carried out. In panel FIG. 6*a* the first catch data points (may also be referred to as haul points) are shown (50). It may be common that the catch data is spatially localized/sparse, i.e., in the present example, the catch data being primarily located in two areas. Also, in this example on-shore area (51) is included for illustration and is represented by a land mask. The land mask may be retrieved from established geospatial databases such as GEBCO or GSHHS or determined internally. If determined internally, it is computed by rasterizing coastline vector data onto the model grid, assigning binary values (0=water, 1=land). This mask may then be used to constrain interpolation and convolution so that probability mass cannot spill onto land. FIG. 6*b*, shows how the catch data points or group of catch data points including the first catch data points are convolved with a radially decaying kernel such as Gaussian/KDE by circles. Each haul point is treated as the center of a kernel (e.g., Gaussian). The kernel distributes probability mass radially, decaying with distance and optionally truncated at a cutoff radius. Overlapping kernels are summed. Kernel density estimation is applied to ensure continuity across neighboring cells and reduce sharp discontinuities. Bandwidth controls the spread. The smoothed probability field is normalized such that values per time slice fall in [0,1] and can be interpreted as probability of presence per grid cell. Constituents of the matrix include spatial indices (latitude, longitude, depth), temporal index, and one or more fish attributes. FIG. 6*c* shows the final resulting smoothed probability field as contour lines, while respecting the land mask, wherein such smoothed probability field is parts of or may be used to densify/populate the sparse catch tensor (C).

Referring back to FIG. 5, the method may include a step of acquiring (which may be requested or received from at least one internal or external data storage) (not shown) environmental data layers for a first geographical region and over a reference period. The environmental data may e.g. include surface temperature, chlorophyll concentration, surface current, bathymetry and wind stress, preferably all of the aforementioned types of data. The Applicant has found through extensive research that these are the most descriptive descriptors used to obtain an accurate fish prediction network.

The environmental data layers are aligned and stacked (120) with the dense training fish presence matrix to form a training data cube.

The method includes a step of training a neural network model (125), by supplying the training data cube as an input and using the training fish-presence matrix (within the data cube), or a loss-scaled variant thereof, as a target, for producing a trained fish-prediction network. A loss-scaled variant rescales the training fish-presence matrix to adjust class imbalance. For example, positive cells (fish presence) may be weighted higher than background cells. This is implemented by multiplying each entry of P by a weight factor w, derived from frequency of positives vs. negatives or from cost-sensitive loss functions. The neural network model may be selected as one or more of the following: a 3D convolutional neural network (CNN), a convolutional LSTM network, a hybrid CNN transfer, or an ensemble of the foregoing three models. The model may preferably be a 3-D CNN/LSTM model.

In some embodiments, the step of training the neural network model comprises iteratively supplying the training data cube (X) for a specific area of interest as an input and the training fish-presence matrix (P), or a loss-scaled variant thereof, as a target, while minimizing a differentiable loss function, such as weighted mean-squared error, until the loss is below a predetermined threshold. The training process may further involve one or more of the following: dividing the available data into training, validation, and test sets to ensure generalization, followed by preprocessing steps such as scaling environmental rasters, normalizing catch densities, and handling missing values. Additional features may be engineered, for example temporal lags, depth layering, or composite indices derived from environmental variables. To improve robustness and prevent overfitting, regularization strategies such as dropout, weight decay, and early stopping based on validation performance may be employed. Model performance is typically assessed using evaluation metrics such as the F1-score, precision, and recall, with cross-validation providing additional confirmation of reliability. In some embodiments, multiple training data cubes from distinct geographical regions and periods (e.g., North Atlantic and Southeast Pacific) are aggregated for joint training or used sequentially for fine-tuning. Each cube preserves its native grid and calendar but is reprojected/aligned to the model grid before batching, enabling a single network to generalize across regions.

Once the training is done, a trained fish prediction network is produced (130). The trained fish prediction network may be stored in at least one data storage and/or deployed in a production environment such as in a server-side training and/or prediction engine.

The trained fish-prediction network may be used to predict/infer a fish presence matrix, on-demand or periodically.

Figure 7:
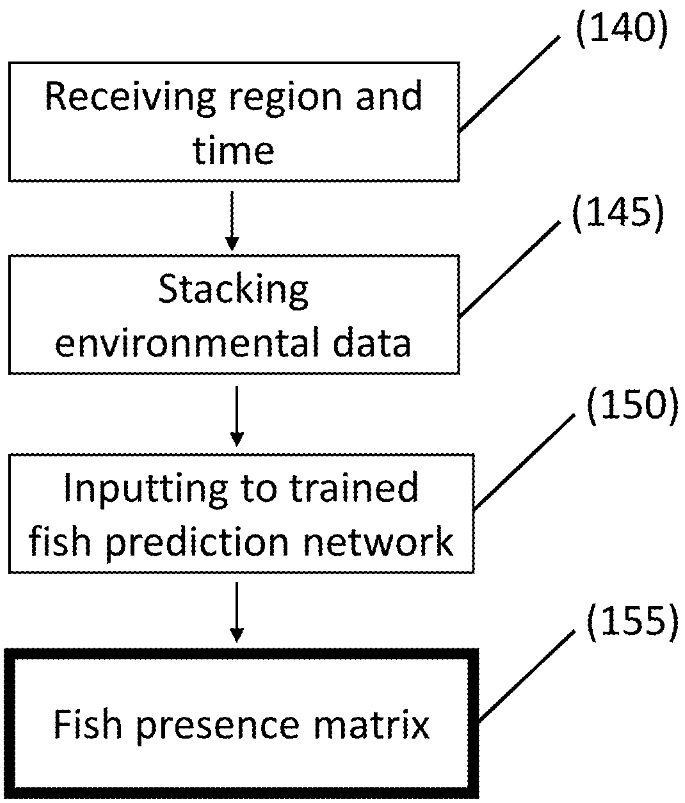
FIG. 7 shows a flowchart illustrating an embodiment of a method for using a trained fish-prediction network to predict a fish presence matrix in accordance with the present invention.

Referring to FIG. 7, which shows an embodiment of a method for using a trained fish-prediction network to infer a fish presence matrix.

The method includes a step of receiving/acquiring a second geographical region and a prediction time interval (140). The step of receiving may comprise receiving geographical region data, e.g., in the form of one or more coordinate data, and prediction time interval, e.g., in the form of one or more dates, from a client terminal. Alternatively, the second geographical region, or data thereof, and prediction time interval, or data thereof, may be pre-defined and received/acquired from at least one data storage, e.g., where the region has for example be predefined for a given fishing vessel and the prediction time interval may have a fixed date set, e.g., 1 day forecast, or 2 day forecast, or 3 day forecast, or 4 day forecast, or 5 day forecast, or 7 day forecast.

In some embodiments, the second geographical region may be the same as the first geographical region. Alternatively, it may be a subset of the first geographical region.

The method includes a step of acquiring second environmental data layers for the second geographical region and over the prediction time interval and stacking them to form an inference data cube (145). The environmental data layers may be obtained from at least one internal or external data storage or even from forecasting models configured to forecast environmental data for the prediction time interval.

The method includes a step of applying the trained fish-prediction network to the inference data cube (X') (150) for inferring a fish-presence matrix (P') (155) representing at least one fish catch attributes or fish-presence event for each grid cell of the second geographical region over the prediction interval. In some embodiments, the fish catch attributes or fish presence events may comprise one or more of the following: total amount of catch, type (species) of one or more aquatic animals to be fished, relative composition of catch in terms of species, amount of bycatch in catch, or any combination thereof.

The method may further include a step of selecting the type of fish catch attributes and/or fish presence events (not shown). In such embodiments, the fish presence matrix may be filtered to obtain only the selected type of fish catch attributes and/or fish presence events. Alternatively, the trained fish prediction network may be used directly to infer only the selected fish catch attributes and/or fish presence events.

The method may include a step of using the unfiltered or filtered fish-presence matrix (P') to determine a fishing ground. Such a step may be carried out manually by a user e.g., through the use of visual or textual representation of the fish presence matrix. Alternatively, it may be carried out automatically, e.g., through optimization of the discrete fish presence matrix according to a target objective such as, but not limited to, maximum amount of catch. The optimization of fishing grounds from the predicted fish-presence matrix is not limited to neural network training but instead refers to selecting the spatial and temporal regions that maximize a chosen objective, such as expected catch. In practice, the algorithm evaluates the probability or density values in each grid cell of the fish-presence matrix and searches for regions where these values are highest, optionally weighted by user-defined priorities such as fuel efficiency or by-catch reduction. This search may be performed by straightforward maximization of cell values, by aggregating neighboring cells into candidate fishing grounds and ranking them, or by route-based optimization methods that balance travel cost with expected yield. In this way, the discrete probability field is transformed into a set of recommended fishing grounds aligned with the optimization objective.

The method may further include a step of instructing an operator for navigating (e.g., a fishing vessel) to the determined fishing ground and/or a step of instructing an operator to fish at the determined fishing ground.

Figure 8:
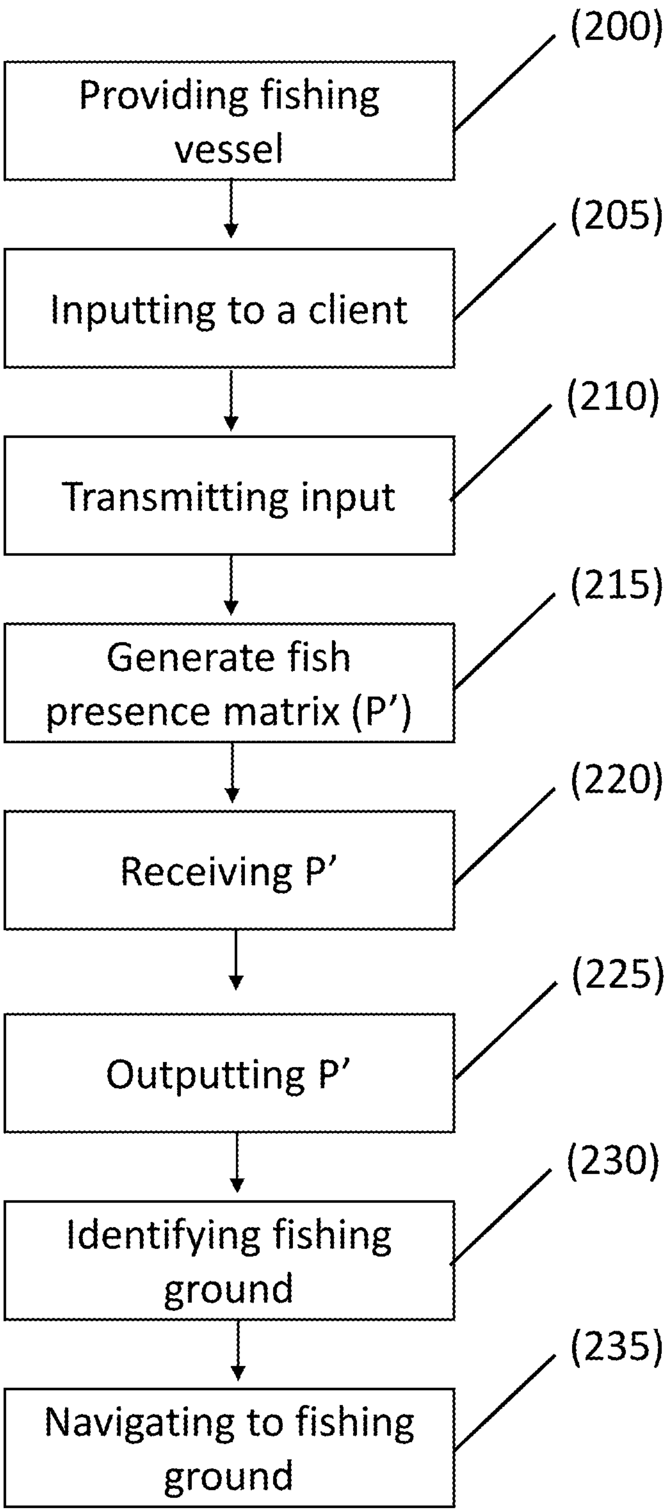
FIG. 8 shows a flowchart illustrating an embodiment of a method for fishing in accordance with the present invention.

FIG. 8 shows an embodiment of a method for fishing using a fish presence matrix.

The method may be executed on a fishing vessel which includes at least the client terminal as described herein with the client terminal being communicatively coupled with a server-side training and/or prediction engine as described herein. Alternatively, the fishing vessel may comprise both the client side processing device (i.e., the client terminal) and the server-side training and/or prediction engine.

The method may include a step of inputting (205), to a client terminal on board or arranged on the fishing vessel, a prediction time interval and second geographical region. Alternatively, the method may include a step of acquiring/receiving the second geographical region e.g., from at least one data storage. In such embodiments, the second geographical region being defined a priori for the fishing vessel. The same may apply to the prediction time interval.

The method may include a step of transmitting (210), to the server-side training and/or prediction engine connected to the client terminal, the second geographical region and the prediction time interval. Alternatively, the method may include a step of transmitting identification code, wherein the identification code is characteristic of the fishing vessel and used for identification of the fishing vessel, of the fishing vessel to the server-side training and/or prediction engine which in turn acquires the second geographical region e.g., from at least one data storage for the fishing vessel. In such embodiments, a predetermined second geographical region may be assigned, in the training and/or prediction engine, to individual fishing vessels based on the identification code.

The method may include a step of executing (215), at the server-side training and/or prediction engine, the computer-implemented method for predicting a fish presence matrix, or any embodiment thereof, or any combination of embodiments thereof, as described herein, so as to generate a fish-presence matrix (P') for the prediction time interval and the second geographical region.

The server-side training and/or prediction engine being configured to transmit the fish presence matrix to the client terminal.

The method thus includes a step of receiving (220), by the client terminal, the fish-presence matrix (P').

The method includes a step of outputting (225) the fish-presence matrix to a user. Such a step may be carried out through creating and displaying a visual representation of the fish-presence matrix, or alternatively, or additionally, as a textual representation of the fish-presence matrix. The fish-presence matrix (P') is fundamentally a multidimensional array indexed by spatial and temporal coordinates, with each entry containing probability or density values for one or more fish catch attributes. Although mathematical in structure, the matrix is presented to the user in an accessible form, typically rendered as contour or surface plots overlaid on a map within a graphical user interface, allowing spatial and temporal patterns of fish distribution to be visualized directly.

Alternatively, the same information may be expressed as tables, where rows and columns correspond to grid coordinates and successive tables represent different time slices. The output may be displayed on the GUI of a client terminal or integrated into the electronic chart display of the navigation system, thereby enabling the fish-presence matrix to be perceived as a navigable fishing map rather than a raw numerical dataset.

The method may include a step of identifying (230), on the basis of the output fish presence matrix, a fishing ground. As non-limiting examples, a fishing ground could be identified as a spatial and temporal region with an absolute maximum yield of catch, or a nearby region with a local maximum yield of catch, or a region of high quality catch, or a region with catch that minimizes by-catch. Such identification may be carried out manually or automatically as described above.

The method may include a step of instructing an operator of navigating (235) the fishing vessel to the fishing ground.

The method may further include a step instructing an operator/user to carry out fishing operations at the fishing ground.

Example 1 (an Example of Training)

First catch data is collected/received over a reference period and first geographical regions. Raw catch points that are close in space or on consecutive days are first linked into short tracks; any daily gaps inside a track are filled by linear interpolation. Each track is then buffered with a Gaussian surface that decays to near-zero five kilometers from the center, and the same value decays exponentially through the next three days. The resulting stack of space-time rasters becomes the target. Into a five-layer CNN followed by a single LSTM step we feed only the aligned environmental tensors; temperature, chlorophyll-a, sea-surface height and bathymetry while the target acts as ground truth. Training runs for 150 epochs with a weighted mean-squared-error loss that gives positive cells five times the weight of background, and early stopping freezes the model once validation loss plateaus.

Example 2 (Comparative Example)

We used 60 000 mackerel catch logs recorded by Icelandic vessels between 2010 and 2024, plus 120 000 randomly drawn background points that serve as negatives. Logs from 2010-2019 formed the training set, 2020 the validation set, and 2021-2024 the test set. Both our CNN/LSTM and a strong 3-D U-Net baseline received exactly the same environmental inputs.

TABLE 1

Comparison of two models, (i) the baseline SVM regressor and (ii) the proposed CNN/LSTM.

| Model | Precision | Recall | F1 |
|---|---|---|---|
| Baseline SVM regressor | 0.65 | 0.66 | 0.69 |
| Proposed CNN/LSTM | 0.88 | 0.89 | 0.89 |

On the four most recent years the proposed method detected 89% of true hotspots while keeping false alarms low, lifting F1 from 0.82 to 0.89 which is a 9% relative gain. Bootstrapping the test years (1 000 draws) gives a 95% confidence interval of +0.02 for the F1 difference, confirming the improvement is real. The higher recall means fewer missed fishing opportunities, and the better precision saves fuel by avoiding empty ground.

Example 3 (Computational Efficiency)

Because spatial and temporal smoothing happens once, offline, the neural network can be trimmed from a 52-million-parameter U-Net to a 5-million-parameter CNN/LSTM with no accuracy loss. The model is trained at a single time, re-training is only needed when new science variables are added so compute cost is paid once instead of continuously. At inference the compact network needs about one-tenth the floating-point operations and one-quarter the memory of the U-Net, letting a laptop-class GPU (RTX 3050) render a 100×400 km tile in under 200 ms while drawing less than 45 W.

SPECIFIC EMBODIMENTS

The following is a list of specific embodiments of the present invention:

1. A computer-implemented method for training a neural network model to obtain a trained fish-prediction network, comprising:
   a. acquiring a plurality of first catch data for a first geographical region over a reference period, the first catch data comprising georeferenced fish catch attributes or fish presence events;
   b. time-aligning and geo-aligning the first catch data on a pre-defined spatial-temporal grid for producing an initial sparse catch tensor;
   c. densifying the sparse catch tensor for generating a training fish-presence matrix, wherein the training fish presence matrix comprises approximate values in grid cells representative of probability of fish catch attributes or fish presence in the grid cells;
   d. acquiring first environmental data layers for the first geographical region over the reference period;
   e. stacking the first environmental data layers together with the training fish-presence matrix to form a training data cube;
   f. training a neural network model, by supplying the training data cube as an input and using the training fish-presence matrix, or a loss-scaled variant thereof, as a target for producing a trained fish prediction network.
2. The method according to clause 1, wherein the method further comprises a step of storing the trained fish prediction network in a memory device or at least one data storage.
3. The method according to any of the preceding clauses, wherein the step of training the neural network model comprises iteratively supplying the training data cube as an input and the training fish-presence matrix, or a loss-scaled variant thereof, as a target, while minimizing a differentiable loss function such as weighted mean squared error, until the loss is below a predetermined threshold.
4. The method according to any of the preceding clauses, wherein the neural network model is selected as one or more of the following: a 3D convolutional neural network (CNN), a convolutional LSTM network, a hybrid CNN transfer, or an ensemble of the foregoing three models.
5. The method according to any of the preceding clauses, wherein the step of densifying the sparse catch tensor comprises steps of:
   a. interpolating temporal gaps for producing motion paths between consecutive first catch data; and,
   b. convolving non-zero grid cells with at least one radially decaying probability distribution kernel.
6. The method according to clause 5, wherein the step of interpolating uses linear interpolation, Brownian interpolation, or waypoint routed models.
7. The method according to clause 5, wherein the interpolation is constrained by land-sea mask to prevent motion paths from crossing land area.
8. The method according to clause 5, wherein the probability distribution kernel comprises one or more of the following: Gaussian kernel, Epanechnikov kernel, kernel density-estimation (KDE) function with a tunable bandwidth.

9. The method according to any of the preceding clauses, wherein the environmental layers comprise data of one or more of the following: surface temperature, chlorophyll concentration, surface current, bathymetry and wind stress.
10. The method according to any of the preceding clauses, wherein the fish catch attributes or fish presence events comprise one or more of the following: total amount of catch, type (species) of one or more aquatic animals, relative composition of catch in terms of species, amount of bycatch in catch, or any combination thereof.
11. The method according to any of the preceding clauses, wherein the method further comprises a step of selecting the type of fish catch attributes or fish presence events and filtering the fish presence matrix according to the selection.
12. The method according to any of the preceding clauses, wherein the method further comprises steps of:
    a. receiving a second geographical region and a prediction time interval;
    b. acquiring second environmental data layers for the second geographical region over the prediction time interval and stacking them to form an inference data cube,
    c. applying the trained fish-prediction network to the inference data cube for inferring a fish-presence matrix representing at least one fish catch attributes or fish-presence event; and,
    d. outputting the fish-presence matrix.
13. The method according to any of the preceding clauses, wherein the step of receiving a second geographical region and a prediction time interval is received from a client terminal.
14. The method according to any of the preceding clauses, wherein the method further comprises a step of returning the fish-presence matrix to a client terminal.
15. The method according to any of the preceding clauses, wherein the method further comprises a step of using the second fish-presence matrix to determine a fishing ground.
16. A non-transitory computer readable medium storing instructions which, when executed by at least one processor unit, perform the method of any of clauses 1-15.
17. A system for training a neural network model to obtain a trained fish-prediction network comprising:
    a. a server-side training and/or prediction engine, comprising:
        i. at least one processor unit; and,
        ii. a non-transitory memory storing instructions which, when executed cause the at least one processor to perform the method according to any of clauses 1-15.
18. The system according to clauses 17, wherein the system further comprises a client terminal communicatively coupled to the server side training and/or prediction engine, the client terminal comprising:
    i. at least one processor unit;
    ii. a non-transitory memory storing instructions which, when executed, cause the processor to
        1. receive, from the training and/or prediction engine a fish-presence matrix or receive, from the training and/or prediction engine, a trained fish prediction network and using the received trained fish prediction network to predict a fish presence matrix using a second geographical region and a prediction time interval;
    iii. an output means configured to output the fish-presence matrix to a user.
19. The system according to clauses 18, wherein the client terminal or memory thereof further comprises instructions to transmit a query comprising the second geographical region and the prediction time interval to the server-side training and/or prediction engine.
20. The system according to clauses 18, wherein the client terminal or memory thereof further comprise instructions of filtering the fish-presence matrix to one or more user selected fish catch attributes or fish presence events.
21. A fishing vessel comprising the system of any of clauses 18 to 20, wherein the fishing vessel comprises at least the client terminal, and wherein the client terminal is configured for data exchange with the server-side training and/or prediction engine.
22. The fishing vessel according to clauses 21, wherein the client terminal is coupled with an electronic chart display of a navigation system of the fishing vessel such that the client terminal may provide coordinates of a fishing ground to the electronic chart display or overlay a visual representation of the fish presence matrix on a map in the electronic chart display.
23. A method of guiding a fishing vessel to a fishing ground using a fish presence matrix, comprising:
    a. executing, at a server side training and/or prediction engine, the method according to any of clauses 12-15 so as to infer a fish presence matrix for a specified prediction time interval and a second geographical region or receive or train a neural network model to obtain a trained fish prediction network;
    b. receiving, by a terminal client onboard a fishing vessel and wherein the terminal client is communicatively coupled to the training and/or prediction engine, the fish presence matrix or receiving, by a terminal client onboard a fishing vessel and wherein the terminal client is communicatively coupled to the training and/or prediction engine, the trained fish prediction network and using the trained fish prediction network to infer a fish presence matrix with a second geographical region and a prediction time interval as input; and,
    c. outputting the fish presence matrix to a user.
24. The method according to clauses 23, wherein the method further comprises a step of transmitting the prediction time interval and second geographical region, from the terminal client to the server-side training and/or prediction engine.
25. The method according to any of clauses 23 to 24, comprising a step of selecting at least one fish catch attribute or fish presence event and a step of filtering the fish presence matrix according to the selection.
26. The method according to any of clauses 23 to 25, wherein the method may further comprise a step of providing instructions to an operator of the fishing vessel to navigate to a fishing ground derived from the fish presence matrix and/or to carry out fishing operations at a fishing ground derived from the fish presence matrix.
27. A computer-implemented method for training a neural network model to obtain a trained fish-prediction network and using the fish-prediction network to infer a fish presence matrix, comprising:

a. acquiring a plurality of first catch data for a first geographical region over a reference period, the first catch data comprising georeferenced fish catch attributes or fish presence events;

b. time-aligning and geo-aligning the first catch data on a pre-defined spatial-temporal grid for producing an initial sparse catch tensor;

c. densifying the sparse catch tensor for generating a training fish-presence matrix, wherein the training fish presence matrix comprises approximate values in grid cells representative of probability of fish catch attributes or fish presence in the grid cells;

d. acquiring first environmental data layers for the first geographical region over the reference period;

e. stacking the first environmental data layers together with the training fish-presence matrix to form a training data cube;

f. training a neural network model, by supplying the training data cube as an input and using the training fish-presence matrix, or a loss-scaled variant thereof, as a target for producing a trained fish prediction network;

g. receiving a second geographical region and a prediction time interval;

h. acquiring second environmental data layers for the second geographical region over the prediction time interval and stacking them to form an inference data cube, i. applying the trained fish-prediction network to the inference data cube for inferring a fish-presence matrix representing at least one fish catch attributes or fish-presence event; and, j. outputting the fish-presence matrix.

The invention claimed is:

1. A computer-implemented method for obtaining a trained fish-prediction network, the method comprising:

a. acquiring first catch data for a first geographical region over a reference period, the first catch data comprising fish catch attributes or fish presence events, each associated with a location in the first geographical region and a time in the reference period;

b. transforming the first catch data into a sparse catch tensor for the first geographical region over the reference period by time-aligning and geo-aligning the first catch data on a pre-defined spatial-temporal grid based on the location in the first geographical region and the time in the reference period associated with each of the fish catch attributes or fish presence events;

c. densifying the sparse catch tensor into a training fish-presence matrix by using a motion-aware interpolation engine to determine motion data expanding temporal gaps in the sparse catch tensor using realistic motion paths that detour around land between consecutive first catch data and smoothing the motion data by at least one radially decaying probability distribution kernel;

d. acquiring first environmental data layers for the first geographical region over the reference period, wherein the first environmental data layers comprise weather or meteorological data, marine biological data, and/or oceanographic data;

e. stacking the first environmental data layers together with the training fish-presence matrix to form a training data cube; and f. producing the trained fish prediction network by iteratively supplying the training data cube as an input and using the training fish-presence matrix, or a loss-scaled variant thereof, as a target while minimizing a differentiable loss function until a loss is below a predetermined threshold.

2. The method according to claim 1, wherein the method further comprises a step of storing the trained fish prediction network in a memory device or at least one data storage.

3. The method according to claim 1, wherein the differentiable loss function comprises a weighted mean squared error.

4. The method according to claim 1, wherein the trained fish prediction network comprises one or more of the following: a 3D convolutional neural network (CNN), a convolutional LSTM network, a hybrid CNN transfer, or an ensemble of the foregoing three models.

5. The method according to claim 1, wherein the motion-aware interpolation engine utilizes linear interpolation, Brownian interpolation, or waypoint routed models.

6. The method according to claim 1, wherein the motion-aware interpolation engine is constrained by land-sea mask to prevent motion paths from crossing land area.

7. The method according to claim 1, wherein the at least one radially decaying probability distribution kernel comprises one or more of the following: Gaussian kernel, Epanechnikov kernel, kernel density-estimation (KDE) function with a tunable bandwidth.

8. The method according to claim 1, wherein the weather or meteorological data, marine biological data, and/or oceanographic data comprises data of one or more of the following: surface temperature, chlorophyll concentration, surface current, bathymetry and wind stress.

9. The method according to claim 1, wherein the fish catch attributes or fish presence events comprise one or more of the following: total amount of catch, species of one or more aquatic animals, relative composition of catch in terms of species, amount of bycatch in catch, or any combination thereof.

10. The method according to claim 1, wherein the method further comprises steps of:

a. receiving a second geographical region and a prediction time interval, wherein the second geographical region is within the first geographical region;

b. acquiring second environmental data layers for the second geographical region over the prediction time interval and stacking them to form an inference data cube, c. applying the trained fish-prediction network to the inference data cube for inferring a fish-presence matrix representing at least one of a fish catch attribute or a fish-presence event; and, d. outputting the fish-presence matrix.

11. The method according to claim 10, wherein the method further comprises a step of selecting a type of fish catch attributes or fish presence events and filtering the training or inferred fish presence matrix according to the selection.

12. The method according to claim 10, wherein the step of receiving the second geographical region and the prediction time interval is received from a client terminal.

13. The method according to claim 10, wherein the method further comprises a step of returning the fish-presence matrix to a client terminal.

14. A non-transitory computer readable medium storing instructions which, when executed cause at least one processor unit to perform steps comprising:

a. acquiring first catch data for a first geographical region over a reference period, the first catch data comprising fish catch attributes or fish presence events, each associated with a location in the first geographical region and a time in the reference period;
b. transforming the first catch data into a sparse catch tensor for the first geographical region over the reference period by time-aligning and geo-aligning the first catch data on a pre-defined spatial-temporal grid based on the location in the first geographical region and the time in the reference period associated with each of the fish catch attributes or fish presence events;
c. densifying the sparse catch tensor into a training fish-presence matrix by using a motion-aware interpolation engine to determine motion data expanding temporal gaps in the sparse catch tensor using realistic motion paths that detour around land between consecutive first catch data and smoothing the motion data by at least one radially decaying probability distribution kernel;
d. acquiring first environmental data layers for the first geographical region over the reference period, wherein the first environmental data layers comprise weather or meteorological data, marine biological data, and/or oceanographic data;
e. stacking the first environmental data layers together with the training fish-presence matrix to form a training data cube; and
f. producing the trained fish prediction network by iteratively supplying the training data cube as an input and using the training fish-presence matrix, or a loss-scaled variant thereof, as a target while minimizing a differentiable loss function until a loss is below a predetermined threshold.

15. A system for obtaining a trained fish-prediction network, the system comprising:
g. a server-side training and/or prediction engine, comprising:
i. at least one processor unit; and,
ii. a non-transitory memory storing instructions which, when executed cause the at least one processor unit to perform steps comprising:
1. acquiring first catch data for a first geographical region over a reference period, the first catch data comprising fish catch attributes or fish presence events, each associated with a location in the first geographical region and a time in the reference period;
2. transforming the first catch data into a sparse catch tensor for the first geographical region over the reference period by time-aligning and geo-aligning the first catch data on a pre-defined spatial-temporal grid based on the location in the first geographical region and the time in the reference period associated with each of the fish catch attributes or fish presence events;
3. densifying the sparse catch tensor into a training fish-presence matrix by using a motion-aware interpolation engine to determine motion data expanding temporal gaps in the sparse catch tensor using realistic motion paths that detour around land between consecutive first catch data and smoothing the motion data by at least one radially decaying probability distribution kernel;
4. acquiring first environmental data layers for the first geographical region over the reference period, wherein the first environmental data layers comprise weather or meteorological data, marine biological data, and/or oceanographic data;
5. stacking the first environmental data layers together with the training fish-presence matrix to form a training data cube;
6. producing the trained fish prediction network by iteratively supplying the training data cube as an input and using the training fish-presence matrix, or a loss-scaled variant thereof, as a target while minimizing a differentiable loss function until a loss is below a predetermined threshold.

16. The system according to claim 15, wherein execution of the instructions stored by the memory further comprises steps of:
a. receiving a second geographical region and a prediction time interval;
b. acquiring second environmental data layers for the second geographical region over the prediction time interval and stacking the second environmental data layers to form an inference data cube,
c. applying the trained fish-prediction network to the inference data cube to infer a fish-presence matrix representing at least one of a fish catch attribute or a fish-presence event; and,
d. outputting the fish-presence matrix.

17. The system according to claim 15, wherein the system further comprises a client terminal communicatively coupled to the server side training and/or prediction engine, the client terminal comprising:
i. at least one processor unit;
ii. a non-transitory memory storing instructions which, when executed, cause the at least one processor unit to
1. receive, from the training and/or prediction engine a fish-presence matrix or receive, from the training and/or prediction engine, a trained fish prediction network; and
2. use the received trained fish prediction network to predict a fish presence matrix using a second geographical region and a prediction time interval;
iii. an output means configured to output the fish-presence matrix to a user.

18. The system according to claim 17, wherein the client terminal, or memory thereof, receives instructions to transmit a query comprising the second geographical region and the prediction time interval to the server-side training and/or prediction engine.

19. The system according to claim 17, wherein the client terminal, or memory thereof, receives instructions of filtering the fish-presence matrix to one or more user selected fish catch attributes or fish presence events.

* * * * *